June 12, 1934.                    W. JOSSELYN                    1,962,508
                                   ARMREST
                             Filed April 17, 1931
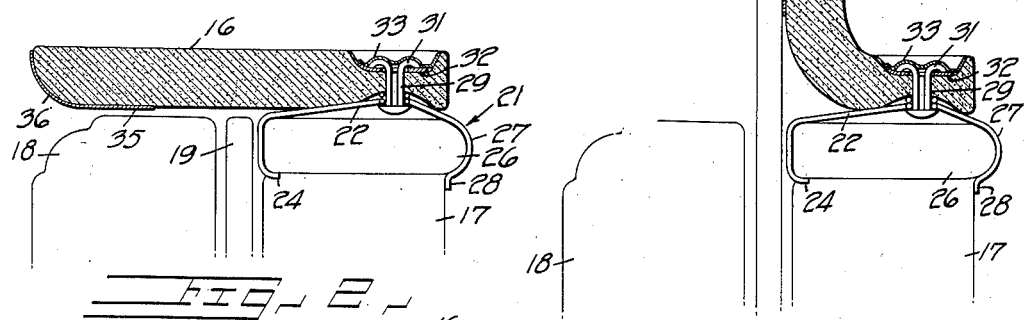
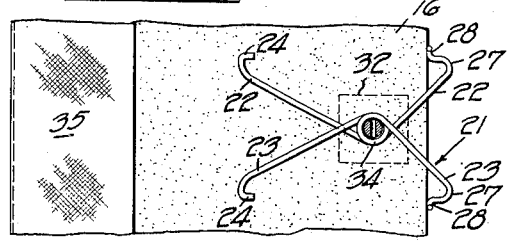
INVENTOR.
WINSOR JOSSELYN
BY
ATTORNEYS.

Patented June 12, 1934

1,962,508

UNITED STATES PATENT OFFICE 1,962,508

ARMREST

Winsor Josselyn, Carmel, Calif.

Application April 17, 1931, Serial No. 530,821

8 Claims. (Cl. 155—198)

My invention relates to an arm rest and more particularly it relates to an arm rest which can be detachably secured to an automobile door.

Many automobile drivers find it convenient to rest one arm on the lower edge of the window frame of the door of a closed car or on the top edge of the door of an open car while driving. It is one object of my invention to provide an arm rest which will add to the comfort of the driver and which will not interfere with opening and closing of the window in the door on which the arm rest is attached.

Another object is to provide an arm rest which is adapted to be attached to the lower portion of an automobile window frame and which is automatically moved to different operative positions upon opening and closing of the window.

Another object is to provide an arm rest of the character described which is provided with novel resilient clamps which permit adjustment of the arm rest to various positions and which can be readily attached to windows and doors of different sizes.

Still another object is to provide an arm rest of the character described which is simple and economical in construction.

These and other objects and advantages are attained in the embodiment of my invention illustrated in the accompanying drawing, in which:

Fig. 1 is a perspective view of an automobile door showing my novel arm rest attached thereto.

Fig. 2 is an end view illustrating the position which the arm rest assumes when the window is in open position.

Fig. 3 is a view similar to that of Fig. 2 illustrating the position of the arm rest when the window is closed.

Fig. 4 is a detail view of a bottom portion of the arm rest illustrating a preferred construction of the retaining clamps.

In its preferred form the arm rest of my invention comprises a pad of suitable resilient material, such as sponge rubber, which is adapted to span the lower edge of an automobile window frame and which is secured in position by clamps which are adapted to embrace the edge of the inner frame of the window. Preferably, the clamps are in the form of resilient claws which can be readily snapped into place or removed and which can be extended to fit window frames of different sizes. In raising and lowering the window the arm rest is adapted to be pushed out of the path of the window or is allowed to drop into a position over the edge of the window and to facilitate sliding of the parts, the portions of the arm rest contacting the window can be provided with a covering or binding of suitable frictionless material. Preferably, the arm rest presents a relatively large and comfortable resting surface in either one of its positions, without projecting into the space within the interior of the car.

Referring now to the drawing, I have shown an arm rest comprising a pad 16 of yieldable material, such as sponge rubber. Other yieldable materials may be used, but I have found sponge rubber to be particularly suitable since it possesses the desired degree of softness and in addition it precludes wear on the coat sleeve and presents a cool surface during hot weather. The pad 16 is preferably of sufficient width to span both the inner and outer window frames 17 and 18 when the window 19 is in its open position, thus affording a relatively large resting surface.

For securing the pad 16 in place one or more resilient clamps or fasteners 21 can be provided, each of which is in the form of expandible claw elements adapted to embrace the edge of the inner frame 17 of the window. Each of the fasteners 21 can be composed of a pair of spring wire members 22 and 23 each of which can be provided with a relatively sharp claw portion 24 adapted to engage the lower side of the finishing strip 26 usually provided along the inner frame of automobile windows. The other end of each of the wire members 22 and 23 can be provided with a somewhat similar claw portion 27, but in order to facilitate attachment and removal and to prevent possible marring of the door or injury to the upholstery thereon, the inner claw portions 27 are provided with relatively blunt ends. For example, the ends of the claw portions 27 can be bent or offset, as at 28, for this purpose. When the window is raised and the pad assumes the position shown in Fig. 3, the relatively sharp claw portions 24 preclude displacement of the device. The blunt claw portions 27, however, facilitate removal of the device since an upwardly directed force against the inside edge of the pad serves to disengage this end of the attaching means. A force of this nature must be deliberately applied, however, and it is not encountered during the normal use of the device, thus precluding accidental displacement of the pad.

For securing the fasteners 21 to the pad 16 any suitable means can be provided and for this purpose I have shown a rivet 29 passing through the pad and having an upset end 31 which engages an anchor 32 in the form of a plate of rigid material, such as metal. Disposed over the metal plate 32 a suitable covering 33, such as of fabric, can be provided to cover and conceal any rough portions of the structure. If desired, the edge of the metal plate 32 disposed toward the window 19 can be curved upwardly, as shown, so that it will not cut into the pad 16 when it assumes the position shown in Fig. 3. Each of the wire members 22 and 23 are preferably coiled about the rivet 19 for one or more turns, as at 34, thereby firmly securing the fasteners 21 to the pad 16. Preferably, the rivets 29 are disposed near the inner edge of the pad 16 so that the pad can be deformed easily while in place without danger of tearing the pad.

In attaching the arm rest, the claw portions 24 are first positioned in the junction between the strip 26 and the inner wall 17 of the door, as illustrated in Figs. 2 and 3, and then the end portions 27 are urged together as shown in Fig. 4 so that the fastener can be made to embrace the strip 26 and thereafter the fastener is permitted to snap into place under the force of the resilient members 22 and 23. It will be apparent that the fasteners will accommodate themselves to door frames of different widths within the limit of expansion of the fasteners and thus fasteners of a single size will be suitable for a large number of automobiles of different models. Since the arm rest is resiliently secured, there is no possibility of its jarring loose and there are no parts of the device which can be the cause of a rattle.

When the window of the automobile is open, as shown in Fig. 2, the pad lies relatively flat and is disposed over the upper edge of the window pane and rests on both the inner and outer frames 17 and 18 of the window, thus forming a comfortable support for the driver's arm while signalling and while at rest.

When the window 19 is raised, the pad 16 is placed under internal stress and is moved to a non-interfering position taking the positon shown in Fig. 3. While in this position the pad still provides a comfortable surface upon which the driver's arm can rest and in addition, the resilient nature of the pad minimizes rattling of the window.

In order to facilitate sliding of the window along the pad 16 and to minimize friction, the lower surface of the pad can have secured thereto a layer 35 of suitable fabric or the like which has a lower coefficient of friction than the sponge rubber of which the pad is made. If desired, the longitudinal edge adjacent the window can be rounded or bevelled, as at 36, to further reduce friction particularly on the downward movement of the window. For windows provided with a metal frame, such as the frame 37 shown in Fig. 3, I prefer to make the edge of the pad bevelled rather than rounded, as indicated at 38. By providing a bevelled edge in this manner the edge rides smoothly over the frame 37 on the downward movement of the window and can not be caught by the lower edge 39 of the frame during normal use.

From the foregoing it will be apparent that the arm rest of my invention can be readily adjusted to different positions along the ledge of the door and that it can be readily removed from one car to another. When in use the device not only serves to minimize wear on the clothing of the driver but it also protects the finish of the car on the window ledge which otherwise would be subjected to greater wear than the finish on other parts of the car. It is to be understood that the arm rest can be made in any desired size and can have any desired color. Also, by placing the fasteners near the center of the pad instead of near the inner edge and by making the fasteners of proper size, the arm rest can be adapted to open cars equally as well as to cars of the closed type.

While I have shown and described a preferred embodiment of my invention, I do not wish to be limited thereto, since the invention as defined in the appended claims can be embodied in a plurality of other forms.

I claim:

1. An arm rest of the character described, said arm rest comprising a pad of yieldable material, means for attaching said pad to the window frame of an automobile, whereby a portion of said pad spans the edge of the window in said window frame when said window is lowered, said window serving to place said pad under internal stress and move the same to a non-interfering position against the force of said stress when the window is raised, said attaching means comprising an expandible member of resilient material for resiliently embracing a portion of said window frame, and means for securing said attaching means to said pad including an anchor in the form of a plate of rigid material, said plate being curved to avoid injury to the pad when the same is placed under internal stress.

2. An arm rest of the character described, said arm rest comprising a pad of sponge rubber, means for attaching said pad to the window frame of an automobile, whereby a portion of said pad spans the edge of the window in said window frame when said window is lowered, said window serving to place said pad under internal stress and move the same to a non-interfering position against the force of said stress when the window is raised, said attaching means comprising an expandible member of resilient material for resiliently embracing the portion of said window frame, claw like end portions on said expandible member for grasping the window frame, the claw like portion on one end being more blunt than the one on the other end, whereby attachment and removal of said pad is facilitated and injury to the exposed portion of the window frame is precluded, means for securing said attaching means to said pad including an anchor in the form of a plate of rigid material, said plate being curved to avoid injury to the pad when the same is placed under internal stress, and a layer of material having a lower coefficient of friction than sponge rubber disposed over the portion of the surface of said pad nearest the window to reduce the friction between the window surface and the pad.

3. An arm rest for use with an inner window frame and an outer window frame together defining a surface and spaced apart to receive therebetween a window adapted to be retracted behind and to be projected beyond said surface, comprising a flexible pad extending over both of said window frames and adapted when said window is retracted to be supported by both of said window frames and when said window is projected to be supported by but one of said window frames.

4. An arm rest for use with an inner window frame and an outer window frame together defining a surface and spaced apart to receive therebetween a window adapted to be retracted behind and to be projected beyond said surface, comprising a flexible pad adjacent said surface and closely overlying both of said window frames and spanning said retracted window, and means for securing said pad to but one of said window frames.

5. An arm rest for use with a pair of substantially coplanar members having a window slot therebetween, comprising a pad of flexible material closely overlying both of said members and being of sufficient strength to span without substantially entering said slot, and means for fastening said pad on but one of said members so that said pad is fixed out of the path of a window projecting from said slot.

6. An arm rest for use with a pair of automobile window frames having substantially coplanar upper surfaces with a window slot therebetween, comprising a flexible pad closely overlying both of said upper surfaces and spanning said slot to act as an arm support, and means for securing said pad to one of said window frames while permitting flexure of said pad out of the path of a window projecting from said slot.

7. An arm rest for use with a pair of substantially coplanar members having a window slot therebetween, comprising a pad of flexible material of sufficient width to overlie both of said members and to span said slot, and means for fastening said pad to one of said members for flexure away from the other of said members and out of the path of a window projecting from said slot.

8. An arm rest comprising a pair of adjacent window frames having substantially coplanar upper surfaces and separated by a window slot, a pad of flexible material of sufficient width to overlie both of said surfaces while spanning said slot and of sufficient strength to act as an arm support, and means for securing said pad to one of said members for flexure away from the upper surface of the other of said members and out of the path of a window projecting from said slot.

WINSOR JOSSELYN.